(12) United States Patent
Roumagnac et al.

(10) Patent No.: US 11,534,710 B2
(45) Date of Patent: Dec. 27, 2022

(54) DOUBLE FILTRATION BROOM VACUUM CLEANER FOR SWIMMING POOL CLEANING

(71) Applicant: Kokido Development Limited, Kowloon (HK)

(72) Inventors: Max Roumagnac, Martignas sur Jalle (FR); Jean Bruneel, Kowloon (HK)

(73) Assignee: Kokido Development Limited, Hong Kong (HK)

( * ) Notice: Subject to any disclaimer, the term of this patent is extended or adjusted under 35 U.S.C. 154(b) by 293 days.

(21) Appl. No.: 16/868,152

(22) Filed: May 6, 2020

(65) Prior Publication Data
US 2020/0353390 A1    Nov. 12, 2020

(30) Foreign Application Priority Data
May 7, 2019 (FR) ...................... 1904746

(51) Int. Cl.
| | | |
|---|---|---|
| *B01D 39/08* | (2006.01) | |
| *E04H 4/16* | (2006.01) | |
| *B01D 29/56* | (2006.01) | |
| *B01D 29/58* | (2006.01) | |

(52) U.S. Cl.
CPC .......... *B01D 39/08* (2013.01); *E04H 4/1636* (2013.01); *B01D 29/56* (2013.01); *B01D 29/58* (2013.01); *B01D 2201/0415* (2013.01); *B01D 2201/307* (2013.01)

(58) Field of Classification Search
CPC ........ B01D 39/08; B01D 29/56; B01D 29/58; B01D 2201/0415; B01D 2201/307; E04H 4/1636; E04H 4/16
USPC ............. 210/167.16, 232, 315, 416.1, 416.2; 15/1.7
See application file for complete search history.

(56) References Cited

U.S. PATENT DOCUMENTS

| | | | |
|---|---|---|---|
| 3,755,843 A | | 9/1973 | Goertzen, III et al. |
| 3,886,616 A | * | 6/1975 | Hayes ................... E04H 4/1618 |
| | | | 15/347 |
| 6,797,157 B2 | | 9/2004 | Erlich |
| 7,636,975 B2 | | 12/2009 | Mah et al. |
| 9,546,493 B2 | | 1/2017 | Chen et al. |
| 9,903,133 B2 | | 2/2018 | Bruneel |
| 10,876,316 B2 | * | 12/2020 | Hui ........................ E04H 4/1636 |
| 2015/0354242 A1 | * | 12/2015 | Saccoccio .............. B01D 29/50 |
| | | | 210/806 |
| 2017/0026598 A1 | | 9/2017 | Sharpley et al. |

FOREIGN PATENT DOCUMENTS

| | | | |
|---|---|---|---|
| FR | 2480340 A | * | 10/1981 |
| FR | 2683845 A1 | * | 5/1993 |
| WO | 0066247 | | 9/2000 |

* cited by examiner

*Primary Examiner* — Fred Prince
(74) *Attorney, Agent, or Firm* — Perman & Green, LLP

(57) ABSTRACT

A broom vacuum cleaner for cleaning swimming pools including a main body, pumping means, a suction head and an upstream filter, placed inside the main body and upstream of the pumping means, the suction brush includes a downstream filter placed outside the main body and downstream of the pumping means, and the upstream and downstream filters are coaxial.

11 Claims, 5 Drawing Sheets

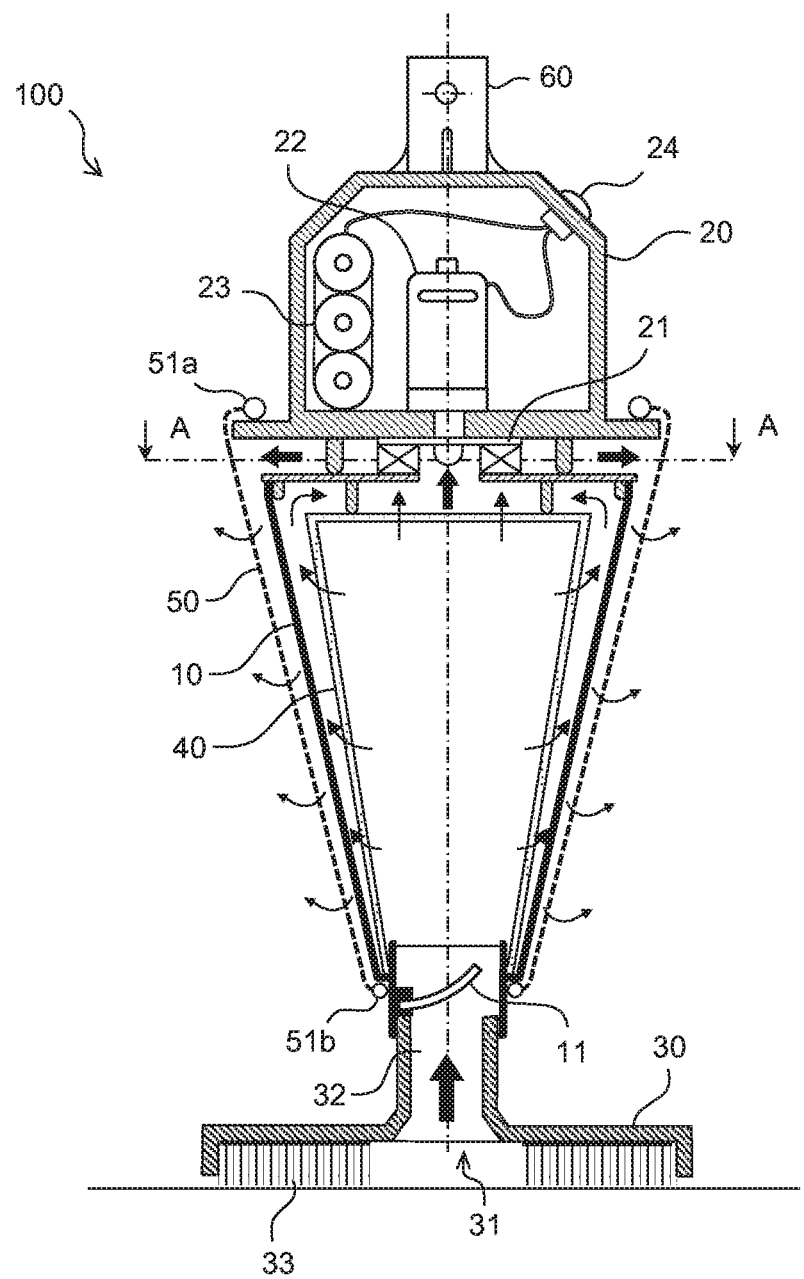

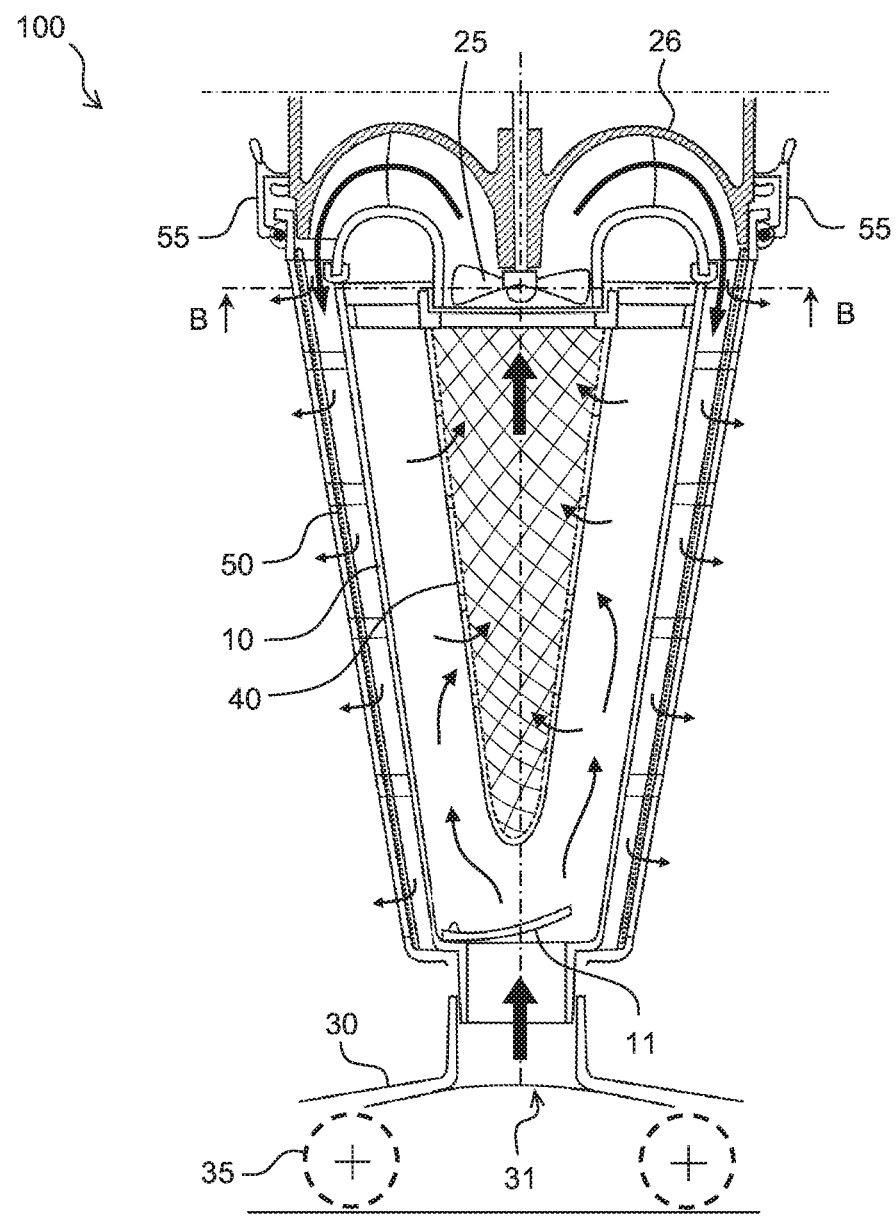

[Fig. 3]
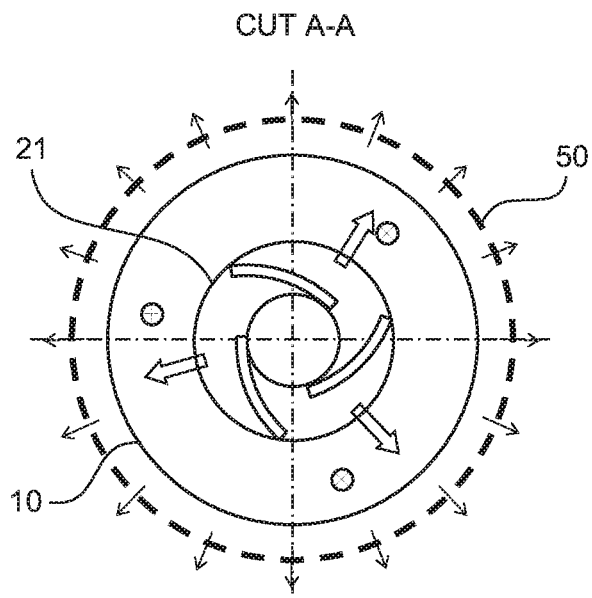
CUT A-A
[Fig. 4]
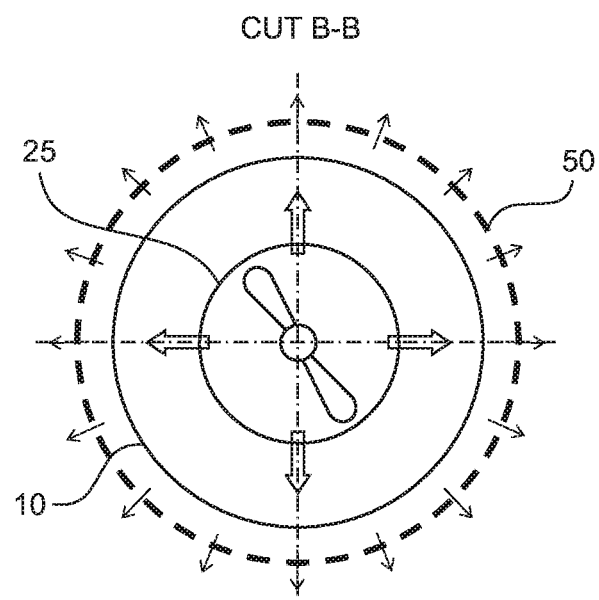
CUT B-B

[Fig. 5a]
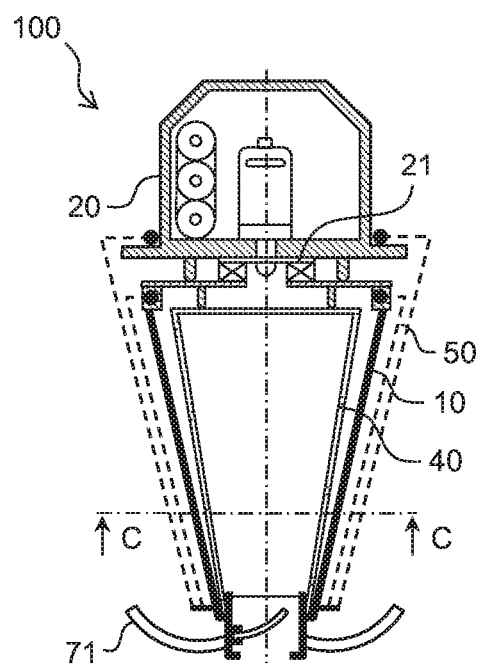
[Fig. 5b]
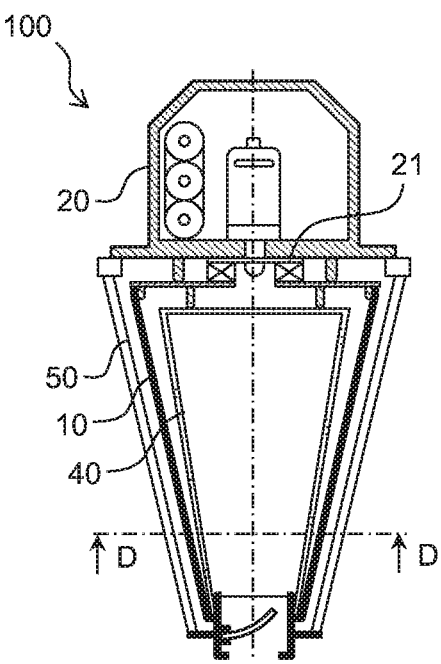
[Fig. 6a]
SECTION C-C
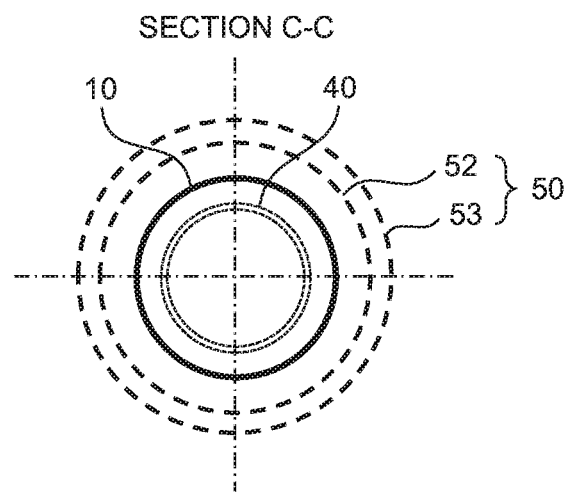
[Fig. 6b]
SECTION D-D
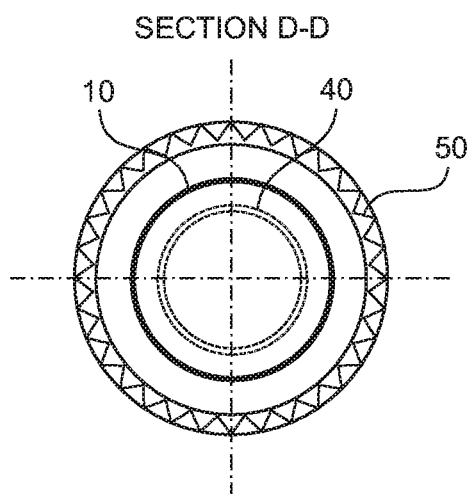

[Fig. 7]
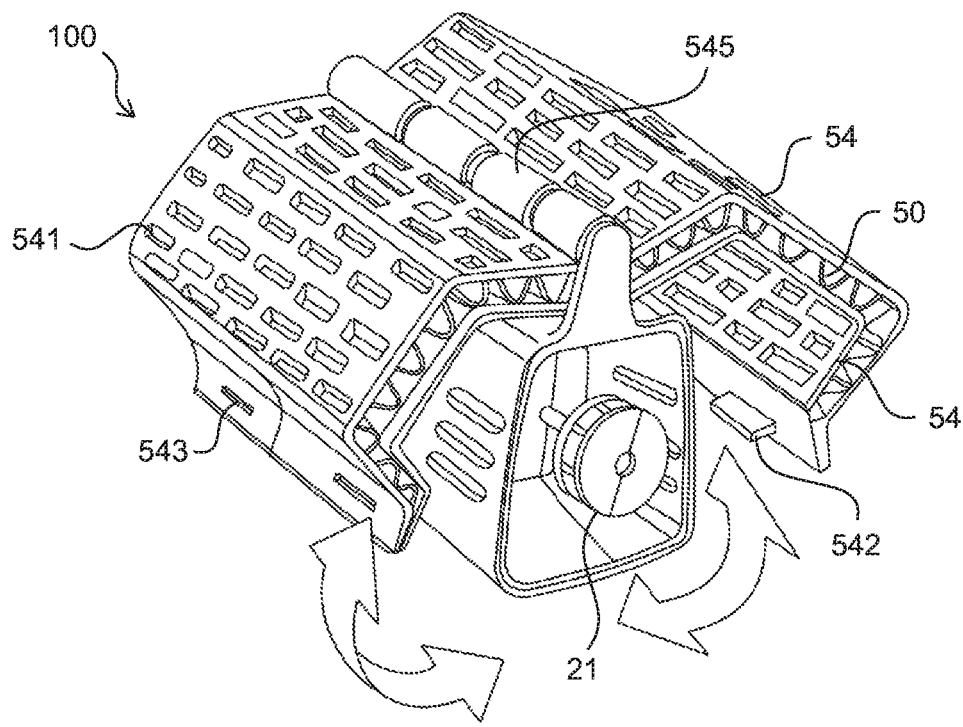
[Fig. 8]
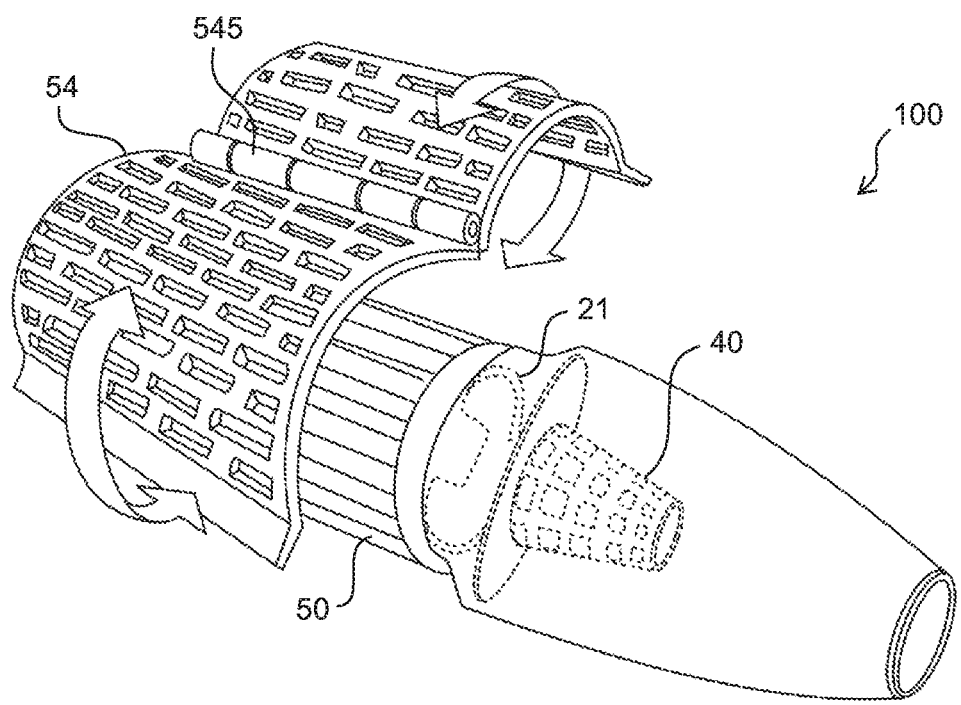

DOUBLE FILTRATION BROOM VACUUM CLEANER FOR SWIMMING POOL CLEANING

CROSS-REFERENCE TO RELATED APPLICATION

This application claims priority to and the benefit of French Application No. FR 1904746 filed on 7 May 2019, the disclosure of which is incorporated herein by reference in its entirety.

BACKGROUND

1. Field

The present disclosure belongs to the field of swimming pool maintenance devices, in particular broom vacuum cleaners, and relates more particularly to a double filtration broom vacuum cleaner for swimming pool cleaning.

2. Brief Description of Related Developments

There are several types of broom vacuum cleaners, called autonomous broom vacuum cleaners because they are power supplied by an on-board battery, intended for cleaning swimming pools, and more generally to operate underwater.

Document US 3755843 discloses a first conventional design according to which the broom vacuum cleaner successively comprises a suction head, a debris container containing a filter then a suction pump which releases the filtered water into the swimming pool.

Several models falling under this concept are marketed, in particular by the 15 companies Watertech, Kokido, Intex and Ryobi, the documents US 6797157 and US 9903133 respectively disclosing the models marketed by the first two.

In the same category, the document US 7636975, in the name of the company Hydrodynamic, discloses a vacuum-type automatic cleaner including a single filter, located inside the debris body.

In order to limit the congestion, particularly the total height of the broom vacuum cleaner, the debris compartment must be of limited capacity, consequently limiting the volume of the filter contained in this compartment as well as its filtering surface. Due to its limited surface, the filter cannot have a high fineness, at the risk of clogging quickly and therefore losing the efficiency of the vacuum cleaner.

This constraint implies the use of filters of an "average" fineness which do not allow capturing the finest particles, the latter are released with the filtered water, and are again in suspension in the water volume of the pool, which is thus imparted with a turbid aspect, before returning to the bottom of the pool, under the effect of gravity, after the cleaning operation.

This phenomenon of rejection of fine particles is a cause of dissatisfaction for most users.

Document US 9546493 discloses a second design according to which the broom vacuum cleaner successively comprises a suction head, a heavy debris compartment without filter, an annular suction pump which allows the passage of voluminous debris then a filtering bag, in extension of the main compartment, which recovers debris and releases filtered water into the swimming pool.

In this design, only the heaviest debris are captured by gravity in the upstream compartment (without filter) and those with a lower density are sucked by the annular pump and propelled in a filter downstream from the suction pump. This unique filter therefore recovers a major part of the debris (leaves, insects and fine particles), nevertheless, due to the fineness of the filter necessary to retain the fine particles, it clogs quickly as in the previous design.

In the field of household vacuum cleaners, the document US 2017265698, in the name of the company Dyson discloses a vacuum cleaner with a first cyclonic air-dust separator at the suction and a second cartridge filter connected to the air outlet and partially surrounding the motor but inside the carcass. This second filter is not completely circular, but has a "C" shape, and the air passage is channelled by two conduits which circulate the air from the ends of the C in two opposite directions of rotation to distribute dust on the entire filter.

Document WO 0066247 discloses a vacuum cleaner consisting of a main case wherein a main filter (air-dust-water separator) at the suction, a motor-fan then a secondary filter and a carbon filter are placed. All the filtration systems, and in particular the secondary filters, are located inside the main case, which case therefore has a large volume and a problematic congestion.

In summary, the existing autonomous broom vacuum cleaners comprise a single filter, located either upstream or downstream the suction pump. If this single filter has a fine mesh it risks rapid clogging by all the debris, and if it has a large mesh it does not block fine particles. Some manufacturers optionally supply fine particle filters, but due to their reduced size (limited by the size of the debris container) they are quickly clogged and must be washed several times during a single cleaning of the swimming pool. These broom vacuum cleaners, suitable for picking up heavy (stones, sand) and voluminous debris (leaves), retain imperfectly or in small amounts the fine particles, this represents a major disadvantage for the user and results in turbid water at the end of the bottom cleaning operation, and/or requires repeated washing of a possible fine filter supplied with the broom vacuum cleaner.

SUMMARY

The present disclosure aims at overcoming the disadvantages and limitations of the prior art.

To this end, the present disclosure relates to a broom vacuum cleaner for cleaning swimming pools including a main body, pumping means, a suction head and an upstream filter, placed inside the main body and upstream of the pumping means. This broom vacuum cleaner is remarkable in that it includes a downstream filter placed outside the main body and downstream of the pumping means, so as to completely or partially wrap said body, and in that said filters are coaxial.

Thus, the upstream filter, the main body and the downstream filter follow one another in this order, starting from the axis of the broom vacuum cleaner to the outside, for better compactness and a limited congestion.

Advantageously, the upstream filter is traversed by the water from the suction of the pumping means, and the downstream filter is traversed by the water from the discharge of said pumping means.

The broom vacuum cleaner therefore allows a double filtration of the water, upstream and downstream of the pumping means. In addition, the meshes of the downstream filter are finer than those of the upstream filter to refine the filtration. Indeed, the particles of larger calibre are captured by the upstream filter, the latter letting through the particles of smaller calibre, which are then captured by the downstream filter.

The double filtration allows limiting the risks of rapid clogging of the filters.

According to an advantageous aspect of the disclosure, the downstream filter is fastened to the main body so as to wrap side walls of said body over their entire circumference and over a length less than or equal to a length of said body.

More particularly, the downstream filter is fastened to the main body by fastening means so as to enclose said body.

For example, the fastening means are annular and allow a sealed fastening.

According to one aspect of the disclosure, the downstream filter consists of a porous material such as a textile.

According to one aspect of the disclosure, the downstream filter comprises at least two layers of adjacent filtering material.

According to one aspect of the disclosure, the downstream filter is placed inside a protective cassette which is integral with the main body or removable, said cassette including at least two articulated flaps.

According to one aspect of the disclosure, the pumping means comprise a turbine driven by an electric motor.

According to an alternative aspect of the disclosure, the pumping means comprise a propeller driven by an electric motor.

Advantageously, the broom vacuum cleaner is autonomous and includes a battery for power supplying the pumping means.

The fundamental concepts of the disclosure having just been exposed above in their most elementary form, other details and features will emerge more clearly upon reading the description which follows and with reference to the appended drawings, giving by way of a non-limiting example an aspect of the disclosure of a broom vacuum cleaner in accordance with the principles of the disclosure.

BRIEF DESCRIPTION OF THE DRAWINGS

The elements of a same figure, as well as the figures themselves, are not necessarily on the same scale. In all the figures, identical or equivalent elements have the same reference numeral.

It is thus illustrated in:

FIG. 1: a schematic view in longitudinal section of a broom vacuum cleaner according to a first aspect of the disclosure;

FIG. 2: a schematic view in longitudinal section of a broom vacuum cleaner according to a second aspect of the disclosure;

FIG. 3: a cut of the broom vacuum cleaner of FIG. 1 along a transverse plane A-A;

FIG. 4: a cut of the broom vacuum cleaner of FIG. 2 along a transverse plane B-B;

FIG. 5*a*: an example of a broom vacuum cleaner according to the disclosure equipped with a downstream filter in two layers;

FIG. 5*b*: another example of a broom vacuum cleaner according to the disclosure equipped with a pleated cartridge filter;

FIG. 6*a*: a section of the broom vacuum cleaner of FIG. 5*a* along a transverse plane C-C;

FIG. 6*b*: a section of the broom vacuum cleaner of FIG. 5*b* along a transverse plane D-D;

FIG. 7: a partial perspective view of a broom vacuum cleaner according to a third aspect of the disclosure;

FIG. 8: a perspective view of a broom vacuum cleaner according to a fourth aspect of the disclosure with the protective cassette removed.

DETAILED DESCRIPTION

The terminology used in the present disclosure should in no way be interpreted in a limiting or restrictive manner. It is simply used in conjunction with a detailed description of some aspects of the disclosure.

In the aspects of the disclosure described below, reference is made to broom vacuum cleaners intended mainly for cleaning swimming pools. This non-limiting example is given for a better understanding of the disclosure and does not exclude the use of the disclosure in other types of pools.

In the following description, the expression "broom vacuum cleaner" designates an automatic swimming pool cleaning apparatus, having an elongated shape and intended to be handled by a user.

FIG. 1 shows a broom vacuum cleaner 100, according to a first aspect of the disclosure, mainly including a body 10 for collecting debris, a sealed functional case 20, surmounting the body 10 and containing suction and power supply means of the broom vacuum cleaner, a suction head 30 at the lower end of the body 10, which comes into contact with the surface to be cleaned, an upstream filter 40 placed inside the body 10, and a downstream filter 50 placed outside the body 10.

The debris collection body 10 has a frusto-conical shape, with a circular or elliptical, or pyramidal base, with any rectangular or polygonal base, with a convergence towards the suction head 30 to increase the speed of the water sucked at the inlet, at said head, and includes a valve 11 which opens under the effect of suction and closes in the absence of suction to prevent debris from falling back into the water of the pool.

The functional case 20, according to the exemplary aspect of the disclosure of FIG. 1, defines an internal volume containing a pump, consisting of a turbine 21 driven by an electric motor 22, and a power supply battery 23 allowing to supply the electrical energy necessary for the motor 22. The battery 23 is rechargeable and can be fastened or removable, thus ensuring the autonomy of the broom vacuum cleaner 100.

The functional case 20 further includes an on/off button 24, and may optionally have other electronic components known to the person skilled in the art, such as a power controller, a power regulator with a control wheel, battery charge indicator lights, etc.

The functional case is also surmounted by a handle head 60 to fasten a handle or any other means for gripping the broom vacuum cleaner 100.

For the understanding of the disclosure, the debris collection body 10 and the functional case 20 can be considered as constituting a single element which would for example be called "main body" of the broom.

The suction head 30, according to the exemplary aspect of the disclosure of FIG. 1, mainly comprises a suction mouth 31, a suction channel 32 communicating both with said mouth and the debris collection body 10, and brush-type cleaning members 33 to unclog the bottom of the pool from its deposits and facilitate cleaning.

The upstream filter 40, according to the exemplary aspect of the disclosure of FIG. 1, has a shape similar to that of the body 10 inside which it is placed, frusto-conical or pyramidal in the present case, and dimensions adapted for its insertion in an internal volume of said body. The upstream filter 40 is a primary filter with "large" meshes which blocks the largest debris and allows the finest debris to pass, in other words it includes meshes having a diameter adapted to prevent the passage of debris considered to be the most voluminous and which constitute a major part of the debris, at least visible debris, but which is not sufficiently reduced to filter the finest debris. As a result, the risks of clogging of this primary filter are limited.

According to the aspect of the disclosure of FIG. 1, the upstream filter 40 is open on the suction channel 32 of the suction head 30 and is for this purpose connected to a portion of the body 10 in extension of said suction channel. Thus, the debris filtered by the upstream filter 40 are retained inside said filter.

Due to its position inside the body 10, the upstream filter 40 operates a filtration upstream of the pump. The water discharged by the pump then passes through the downstream filter 50 which therefore operates a filtration downstream of the pump.

The downstream filter 50, according to the exemplary aspect of the disclosure of FIG. 1, is positioned around the debris collection body 10, which it wraps almost entirely, and constitutes a secondary "fine" mesh filter which blocks small-calibre debris that have not been blocked by the primary filter, the upstream filter 40. In other words, the downstream filter 50 includes meshes having a diameter small enough to prevent the passage of fine particles, up to a certain size.

In addition, the downstream filter 50 has a large filtration surface which reduces the speed of passage of water, so as to allow said filter to capture more fine particles by considerably reducing the risk of rapid clogging. Indeed, the larger the filtering surface, the lower the speed of water passage and the more effective the filtration.

The downstream filter 50, according to the aspect of the disclosure of FIG. 1, is fastened around the debris collection body 10 by upper 51a and lower 51b fastening means, which can be annular such as blocking rings of suitable diameters in order to allow the downstream filter to conform to the shape of the body.

Preferably, the fastening means 51a and 51b allow a sealed fastening to prevent water leaks, and therefore fine particles not yet filtered, at these fasteners and to channel the water from the discharge to the walls of the downstream filter 50.

The fastening means can also be elastic, such as rubber O-rings for easy mounting and dismounting of the downstream filter, provided that the filtering material of the downstream filter in turn has a certain elasticity.

The downstream filter 50 can be mounted on the broom vacuum cleaner 100 by temporarily removing the suction head 30 to pass the downstream filter, through its larger diameter opening, around the body 10 from the converging end of said body.

FIG. 2 shows a broom vacuum cleaner 100, according to a second aspect of the disclosure, wherein the suction is ensured by a pump comprising a propeller 25 coupled to an electric motor not shown.

According to the exemplary aspect of the disclosure of FIG. 2, the propeller is arranged at the foot of an annular case 26 defining curved channels for the passage of water at the discharge.

The suction head 30, according to the exemplary aspect of the disclosure of FIG. 2, is equipped with displacement members 35 such as wheels, casters, rollers, etc.

The upstream filter 40, according to the exemplary aspect of the disclosure of FIG. 2, is open on the pump and closed from below at the inlet of the debris collection body 10. This disposition is the opposite of that of FIG. 1 and allows the body 10 to collect the debris outside the upstream filter 40. The water thus passes through the upstream filter 40 leaving the voluminous debris in the interstitial space between the walls of said filter and those of the body 10, in order to then be discharged by the pump before being filtered by the downstream filter 50.

The downstream filter 50, according to the exemplary aspect of the disclosure of FIG. 2, wraps the debris collection body 10 in the same way as in the first aspect of the disclosure, except that it includes a rigid frame which allows it to be interlocked around said body. The fastening of the downstream filter 50 to the body 10 is carried out in this case by clipping, for example via adapted clipping means 55 installed in an upper part of said filter.

FIGS. 3 and 4 are respectively cuts along transverse planes of the broom vacuum cleaners of FIGS. 1 and 2, and allow visualising the coaxial disposition of the downstream filter 50 around the body 10.

According to a fundamental aspect of the disclosure, the upstream filter 40 and the downstream filter 50 are coaxial and overlap with each other with the side walls of the body 10 located therebetween. This configuration allows having a broom vacuum cleaner which remains compact while having a second filter with a large filtering surface, larger than the lateral surface of the body.

In addition, the downstream filter 50 according to the disclosure can be made of different filtering materials and have various structures.

FIGS. 5a and 6a illustrate a downstream filter 50 consisting of two adjacent filter layers 52 and 53 for greater efficiency. The number of layers can be increased as required. The broom vacuum cleaner 100 can also be provided with deflectors 71 at the inlet of the body 10 above the suction head to divert the water upwards which leaves through the downstream filter 50.

FIGS. 5b and 6b illustrate a downstream filter 50 in the form of a pleated cartridge.

FIG. 7 shows another aspect of the invention of the broom vacuum cleaner 100 wherein the downstream filter 50, which is here cartridged, is placed inside a double-wall protective cassette 54, said cassette being made up of two symmetrical flaps articulated on the body of the vacuum cleaner and closing by clipping.

The protective cassette 54 includes on each of its outer and inner walls slots 541 distributed over its entire surface to allow the passage of water. The flaps of the protective cassette 54 are articulated on the body of the vacuum cleaner by means of a hinge-type connection 545.

The protective cassette 54 is closed and opened by means of lugs 542, placed on the free end of a first flap, and of housings 543, formed in the free end of the second flap, cooperating together by clipping for example.

In the above aspect of the disclosure, the downstream filter 50 also consists of two parts, each of which is placed in a flap of the protective cassette 54.

FIG. 8 shows another aspect of the disclosure of the broom vacuum cleaner 100 wherein the downstream filter 50, which is here cartridged, is made in one piece, and the protective cassette 54 is single-walled. In addition, in this aspect of the invention, the protective cassette 54 is removable, in other words the hinge 545 is not integral with the body of the vacuum cleaner as in the case of FIG. 7.

In both aspects of the disclosure of FIGS. 7 and 8, the downstream filter 50 is placed coaxially with the upstream filter 40 without covering it. As a result, the two upstream 40 and downstream 50 filters are in extension of one another for an even smaller size.

According to the disclosure, the downstream filter 50 can completely or partially wrap the assembly consisting of the debris collection body 10 and the functional case 20. For example, the downstream filter 50 can be placed inside the cassette 54 and wrap with said cassette the walls of the functional case 20 on a circumference less than a circumference of said case and on a length less than or equal to a length of said case. The protective cassette 54 may include a solid wall, without slots, on which gripping means can be fastened.

Another aspect of the disclosure is the fact of being able to add to existing broom vacuum cleaners, provided that they are equipped with an upstream filter 15 placed inside a debris collection body, a downstream filter according to the above principles so as to obtain two coaxial filters framing the debris collection body.

The invention claimed is:

1. A broom vacuum cleaner for cleaning swimming pools including a main body, pumping means, a suction head and an upstream filter, placed inside the main body and upstream of the pumping means, and a downstream filter placed outside the main body and downstream of the pumping means, so as to completely or partially wrap said body, and in that said filters are coaxial.

2. The broom vacuum cleaner according to claim 1, wherein the upstream filter is traversed by water from suction of the pumping means, and the downstream filter is traversed by water from discharge of said pumping means.

3. The broom vacuum cleaner according to claim 1, wherein in that the downstream filter is fastened to the main body so as to wrap side walls of said body over their entire circumference and over a length less than or equal to a length of said body.

4. The broom vacuum cleaner according to claim 1, wherein the downstream filter is fastened to the main body by fastening means so as to enclose said body.

5. The broom vacuum cleaner according to claim 4, wherein the fastening means are annular and allow a sealed fastening.

6. The broom vacuum cleaner according to claim 1, wherein the downstream filter consists of a porous material.

7. The broom vacuum cleaner according to claim 1, wherein the downstream filter comprises at least two layers of adjacent filtering material.

8. The broom vacuum cleaner according to claim 1, wherein the pumping means comprise a turbine (21) driven by an electric motor.

9. The broom vacuum cleaner according to claim 1, wherein the pumping means comprise a propeller driven by an electric motor.

10. The broom vacuum cleaner according to claim 1, further comprising a battery for power supplying the pumping means.

11. The broom vacuum cleaner according to claim 1, wherein the downstream filter is placed inside a protective cassette which is integral with the main body or removable, said cassette including two articulated flaps.

* * * * *